US010350777B2

(12) United States Patent
Kim et al.

(10) Patent No.: US 10,350,777 B2
(45) Date of Patent: Jul. 16, 2019

(54) CUTTING APPARATUS

(71) Applicant: LG CHEM, LTD., Seoul (KR)

(72) Inventors: Youngtae Kim, Daejeon (KR); Yehoon Im, Daejeon (KR); Yushik Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 203 days.

(21) Appl. No.: 15/268,068

(22) Filed: Sep. 16, 2016

(65) Prior Publication Data

US 2017/0087734 A1 Mar. 30, 2017

(30) Foreign Application Priority Data

Sep. 25, 2015 (KR) ........................ 10-2015-0136153

(51) Int. Cl.

*B23C 3/12* (2006.01)
*B26D 1/28* (2006.01)
*B26D 1/00* (2006.01)
*B26D 3/02* (2006.01)

(52) U.S. Cl.

CPC ........... *B26D 1/285* (2013.01); *B26D 1/0006* (2013.01); *B26D 3/02* (2013.01); *B26D 2001/0046* (2013.01)

(58) Field of Classification Search

CPC ........... B23C 3/002; B23C 3/12; B23C 5/202; B23C 5/20; B23C 2200/203; B23C 2200/083; B23C 2200/28; Y10T 409/305364

See application file for complete search history.

(56) References Cited

U.S. PATENT DOCUMENTS 1,195,774 A * 8/1916 Brown, Jr. ............ B23C 5/2472 144/219
1,484,207 A * 2/1924 Campbell ............... B23C 5/242 407/45
2,413,452 A * 12/1946 Kaiser ..................... B23C 5/242 407/36
2,586,955 A * 2/1952 Kaiser ..................... B23C 5/242 407/38
2,903,784 A * 9/1959 Billman ................ B23C 5/2472 407/38
3,117,477 A * 1/1964 Cardell .................. B23D 19/08 409/138

(Continued)

FOREIGN PATENT DOCUMENTS

CN 1479660 A 3/2004
CN 1509833 A 7/2004

(Continued)

*Primary Examiner* — Sara Addisu
(74) *Attorney, Agent, or Firm* — Dentons US LLP

(57) ABSTRACT

The present invention relates to a cutting bite and a cutting apparatus including the same. According to one embodiment of the present invention, a cutting bite is provided to sequentially pass through an upper end portion, a central portion, and a lower end portion of stacked films in a thickness direction of the stacked films when a rotating wheel rotates, and is provided such that cutting is performed in a manner in which a cutting direction of a cutting tip is a direction from an outside toward an inside of the stacked films while the cutting bite passes through the upper end portion toward the lower end portion.

10 Claims, 6 Drawing Sheets

(56) References Cited

U.S. PATENT DOCUMENTS

| | | | | | |
|---|---|---|---|---|---|
| 3,131,458 | A * | 5/1964 | James | A43D 37/005 | 12/17 R |
| RE26,637 | E * | 7/1969 | Vaughn | B23C 5/2208 | 15/93.1 |
| 3,758,928 | A * | 9/1973 | Blake | B42C 5/04 | 407/1 |
| 3,828,409 | A * | 8/1974 | Aspinwall | B42C 5/00 | 407/113 |
| 4,604,011 | A * | 8/1986 | Rungger | B23C 3/12 | 409/132 |
| 4,789,273 | A * | 12/1988 | Wiacek | B23C 5/2213 | 407/34 |
| 4,827,995 | A * | 5/1989 | Wilson | A01G 23/067 | 144/235 |
| 4,856,948 | A * | 8/1989 | Pomikacsek | B23C 3/12 | 409/138 |
| 4,936,718 | A * | 6/1990 | Proffitt | B23C 5/22 | 407/36 |
| 4,964,763 | A * | 10/1990 | Kieninger | B23C 5/207 | 407/101 |
| 5,096,346 | A * | 3/1992 | Ueda | B23C 3/12 | 409/197 |
| 6,056,484 | A * | 5/2000 | Mitchell | B23C 5/2493 | 407/36 |
| 6,116,829 | A * | 9/2000 | Gnann | B23C 3/12 | 409/132 |
| 7,244,082 | B2 * | 7/2007 | Metzner | B25B 11/005 | 409/132 |
| 8,123,445 | B2 * | 2/2012 | Yamamoto | B23C 3/12 | 29/558 |
| 8,327,742 | B1 * | 12/2012 | Austin | B23C 5/2472 | 407/37 |
| 9,545,732 | B2 * | 1/2017 | Koshio | B26D 1/185 | |
| 9,597,738 | B2 * | 3/2017 | Cheronneau | B23C 5/06 | |
| 9,618,180 | B2 * | 4/2017 | Takemura | B26D 7/27 | |
| 9,770,770 | B2 * | 9/2017 | Mada | B23C 5/241 | |
| 9,849,521 | B2 * | 12/2017 | Morandeau | B23C 3/13 | |
| 10,058,932 | B2 * | 8/2018 | Kopton | B23C 5/06 | |
| 2002/0066352 | A1 * | 6/2002 | Satran | B23C 5/08 | 83/839 |
| 2005/0158136 | A1 * | 7/2005 | Higashio | B26D 1/29 | 409/293 |
| 2007/0127992 | A1 * | 6/2007 | Spichtinger | B23C 5/006 | 407/39 |
| 2009/0038450 | A1 * | 2/2009 | Campbell | B23B 29/125 | 82/1.11 |
| 2012/0093594 | A1 * | 4/2012 | Kirchberger | B23C 3/06 | 407/42 |
| 2017/0282260 | A1 * | 10/2017 | Kim | B23C 3/12 | |

FOREIGN PATENT DOCUMENTS

| | | | |
|---|---|---|---|
| CN | 200948512 | Y | 9/2007 |
| CN | 101628347 | A | 1/2010 |
| CN | 202106402 | U | 1/2012 |
| CN | 102574220 | A | 7/2012 |
| CN | 103936275 | A | 7/2014 |
| CN | 104526736 | A | 4/2015 |
| DE | 20203391 | U1 | 7/2003 |
| KR | 1020110111124 | A | 10/2011 |
| KR | 1020120087123 | A | 8/2012 |
| KR | 2020140001306 | A | 3/2014 |

* cited by examiner

【Fig. 1A】
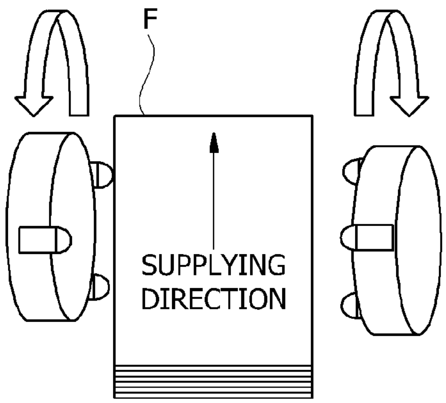
【Fig. 1B】
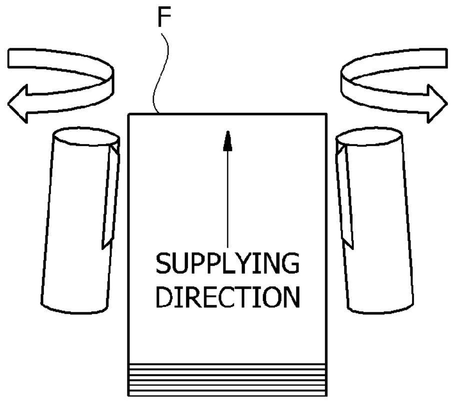

【Fig. 2A】
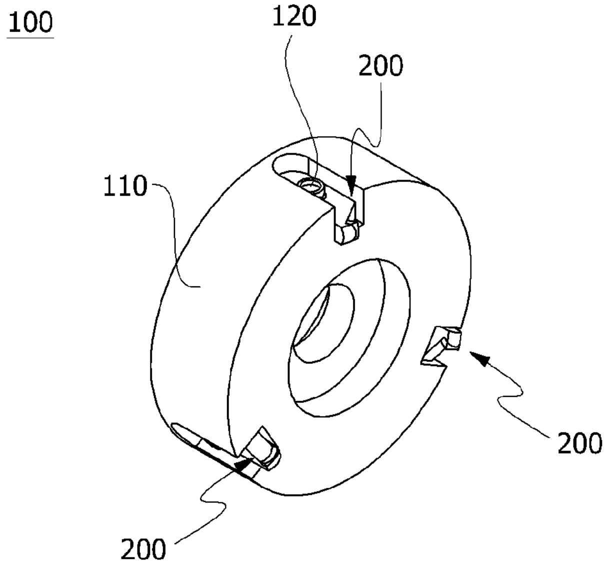
【Fig. 2B】
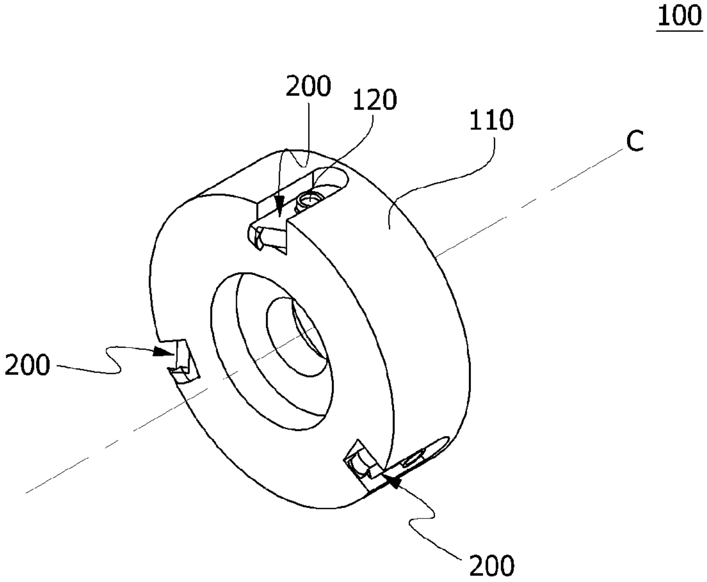

【Fig. 3】
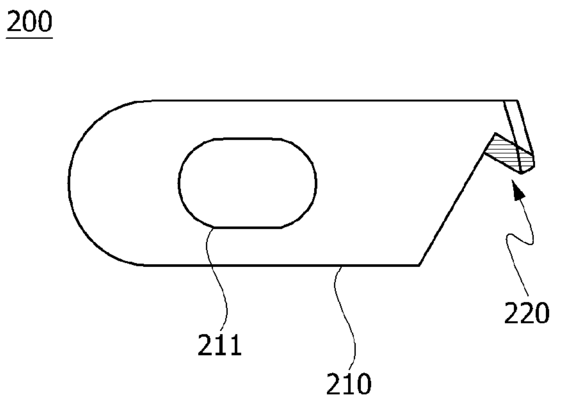
【Fig. 4】
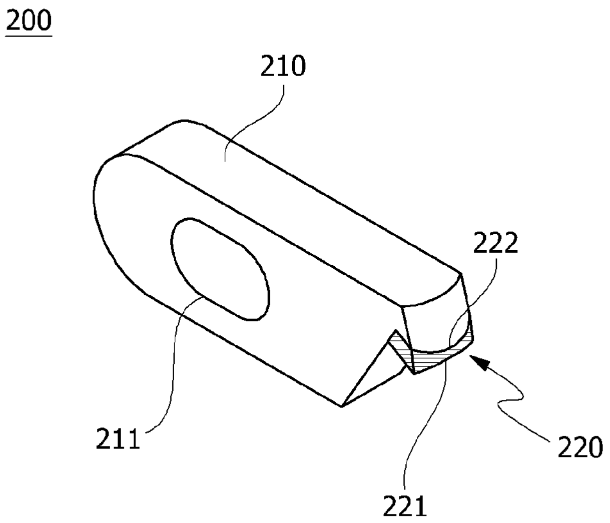

【Fig. 5】
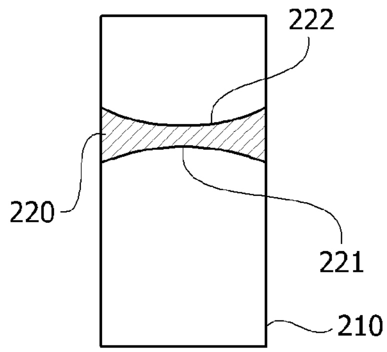
【Fig. 6】
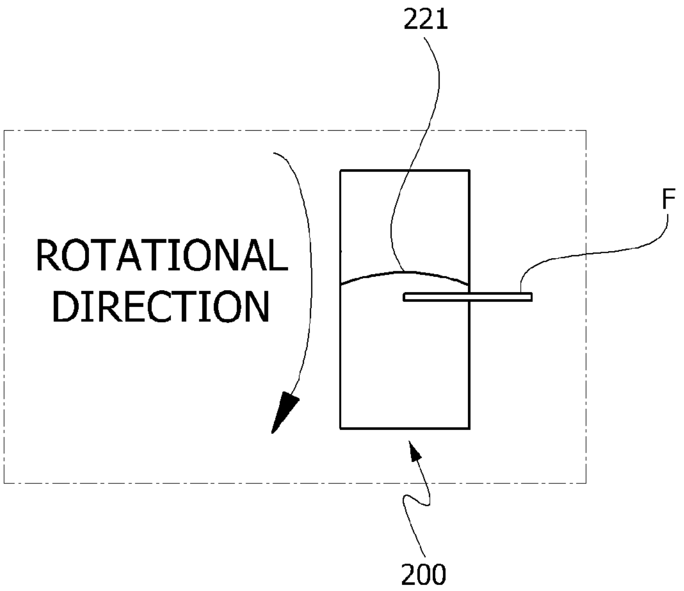

【Fig. 7】
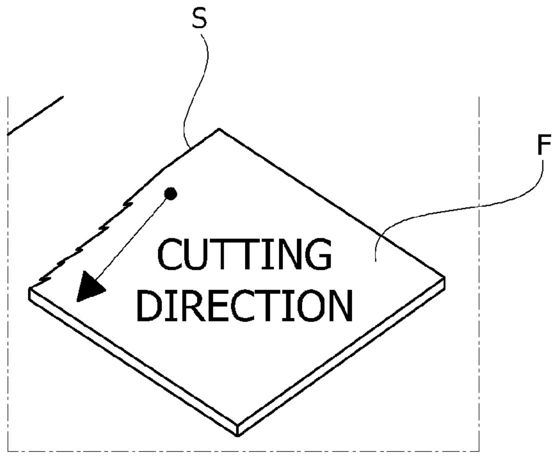
【Fig. 8】
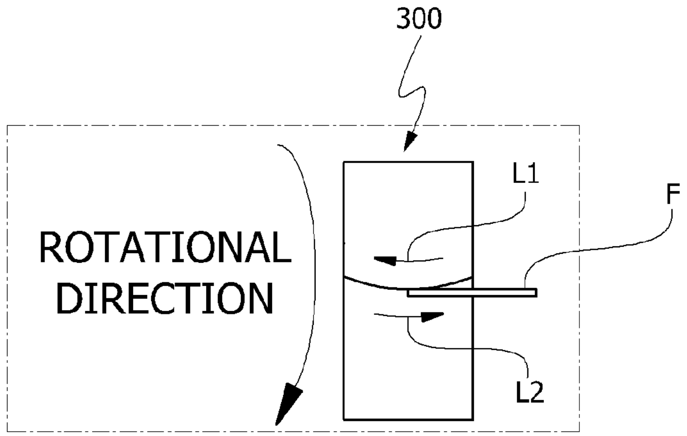

【Fig. 9】
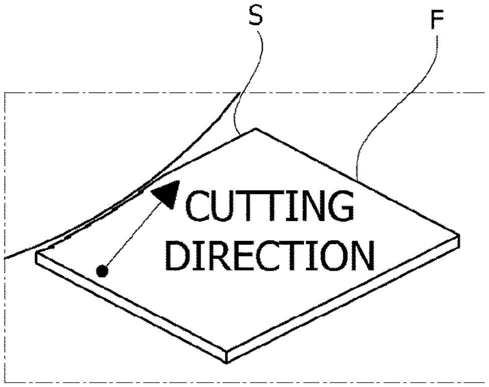
【Fig. 10】
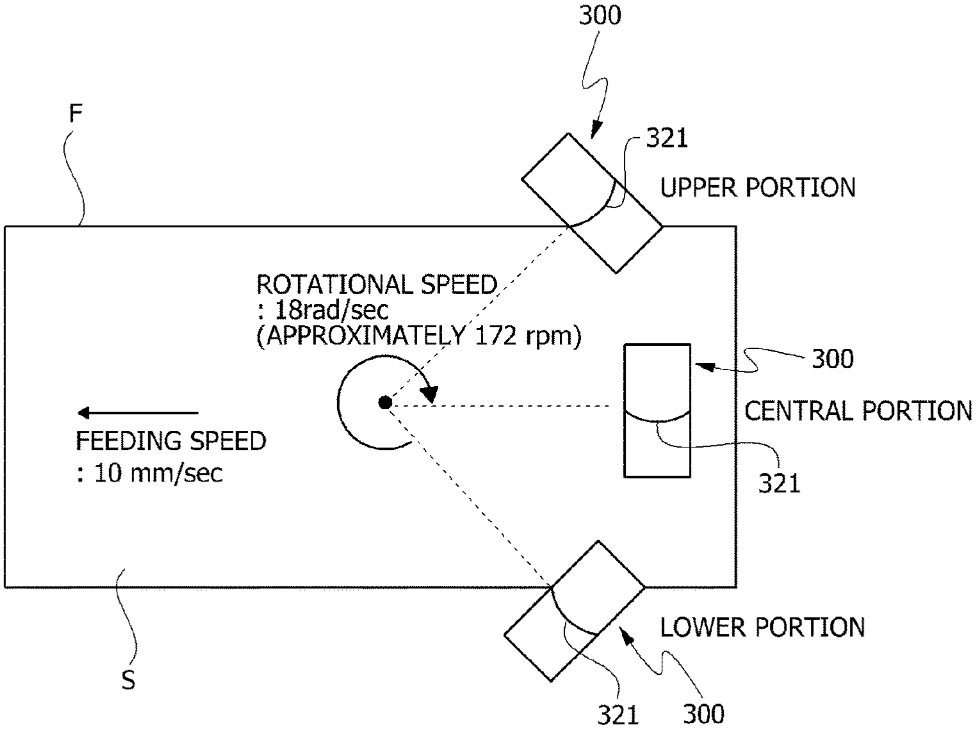

CUTTING APPARATUS

CROSS-REFERENCE TO RELATED APPLICATION

This application claims priority to and the benefit of Korean Patent Application No. 10-2015-0136153, filed on Sep. 25, 2015, the disclosure of which is incorporated herein by reference in its entirety.

BACKGROUND

1. Field of the Invention The present invention relates to a cutting apparatus, and more particularly, to a cutting bite for chamfering stacked films and a cutting apparatus including the same.

2. Discussion of Related Art

Chamfering machines are used for cutting display films out to a desired size.

FIGS. 1A and 1B are conceptual views for describing a general chamfering process.

Referring to FIG. 1, a face cut (F/C) method illustrated in FIG. 1A and an end mill (E/D) method illustrated in FIG. 1B are used in a chamfering machine. Here, in the case of the F/C method, a chamfering machine includes a plurality of cutting bites installed in a rotating wheel, and a chamfering method cuts stacked films F while the cutting bites rotate according to the rotation of the rotating wheel.

In the case of a cutting bite conventionally used for a F/C chamfering machine, a specific section in which a film is cut from the inside toward the outside occurs according to a cutting position in a thickness direction of the stacked films F, and accordingly there is a problem in that micro cracks occur at a cut surface due to a shock that is applied to the film being large in the conventional F/C chamfering machine.

SUMMARY OF THE INVENTION

The present invention is directed to a cutting bite provided to cut stacked films from the outside toward the inside regardless of a cutting position in a thickness direction of the stacked films, and a cutting apparatus including the same.

According to an aspect of the present invention, there is provided a cutting bite used for a chamfering process of stacked films, which includes a main body to be fixed to a rotating wheel and a cutting tip provided at a front end portion of the main body and provided to perform the chamfering process while a state of being in contact with the stacked films is maintained according to a rotation of the rotating wheel.

Here, the cutting tip may be provided such that a cutting line in contact with the stacked films according to a rotational direction of the rotating wheel is formed as a curved line and is provided in a concave shape in which a central portion of the cutting line is inwardly recessed with respect to both side edges of the cutting line.

The cutting tip may be laterally symmetrical with respect to the central portion of the cutting line.

In addition, the cutting tip may be provided such that an overall cutting line is positioned at an inside of an imaginary line that connects both of the edges of the cutting line.

According to another aspect of the present invention, there is provided a cutting bite used for a chamfering process of stacked films, which includes a main body to be fixed to a rotating wheel and a cutting tip provided at a front end portion of the main body and provided to perform the chamfering process while a state of being in contact with the stacked films is maintained according to a rotation of the rotating wheel.

The cutting tip may be provided such that cutting is performed in a manner in which a cutting direction of the stacked films according to a rotation of the rotating wheel is a direction from an outside toward an inside of the stacked films.

The cutting tip may be provided such that a cutting line in contact with the stacked films according to a rotational direction of the rotating wheel is formed as a curved line and is provided in a concave shape in which a central portion of the cutting line is recessed toward the main body with respect to both side edges of the cutting line.

The cutting tip may be laterally symmetrical with respect to the central portion of the cutting line.

In addition, the cutting tip may sequentially pass through an upper end portion, a central portion, and a lower end portion of the stacked films in a direction of a thickness of the stacked films when the rotating wheel rotates, and may be provided such that the cutting is performed in a manner in which the cutting direction is the direction from the outside toward the inside of the stacked films while the cutting tip passes through the upper end portion toward the lower end portion.

According to still another aspect of the present invention, there is provided a cutting apparatus used for a chamfering process of stacked films, which includes a rotating wheel having a center of rotation and a plurality of cutting bites installed in a circumferential direction of the rotating wheel to be spaced a predetermined angle apart from each other.

Here, each of the cutting bites may be provided such that a cutting tip is exposed in the same direction with respect to a rotational direction of the rotating wheel.

Each of the cutting bites may include a main body to be fixed to the rotating wheel and the cutting tip provided at a front end portion of the main body and provided to perform the chamfering process while a state of being in contact with the stacked films is maintained according to a rotation of the rotating wheel.

The cutting tip may be provided such that a cutting line in contact with the stacked films according to the rotational direction of the rotating wheel is formed as a curved line.

The cutting line may be provided in a concave shape in which a central portion of the cutting line is inwardly recessed with respect to both side edges of the cutting line.

The cutting tip may be laterally symmetrical with respect to the central portion of the cutting line.

The cutting tip may be provided such that an overall cutting line is positioned at an inside of an imaginary line that connects both of the edges of the cutting line.

In addition, at least two cutting bites may be installed at different distances from the center of rotation in a radial direction of the rotating wheel.

According to yet another aspect of the present invention, there is provided a cutting apparatus used for a chamfering process of stacked films, which includes a rotating wheel having a center of rotation and a plurality of cutting bites installed in a circumferential direction of the rotating wheel to be spaced a predetermined angle apart from each other.

Here, each of the cutting bites may include a main body to be fixed to the rotating wheel and a cutting tip provided at a front end portion of the main body and provided to perform the chamfering process while a state of being in contact with the stacked films is maintained according to a rotation of the rotating wheel.

The cutting tip may be provided such that cutting is performed in a manner in which a cutting direction of the stacked films according to the rotation of the rotating wheel is a direction from an outside toward an inside of the stacked films.

The cutting tip may be provided such that a cutting line in contact with the stacked films according to a rotational direction of the rotating wheel is formed as a curved line and is provided in a concave shape in which a central portion of the cutting line is recessed toward the main body with respect to both side edges of the cutting line.

The cutting tip may be laterally symmetrical with respect to the central portion of the cutting line.

The cutting tip may sequentially pass through an upper end portion, a central portion, and a lower end portion of the stacked films in a thickness direction of the stacked films when the rotating wheel rotates, and may be provided such that cutting is performed in a manner in which the cutting direction is the direction from the outside toward the inside of the stacked films while the cutting tip passes through the upper end portion toward the lower end portion.

At least two cutting bites may be installed at different distances from the center of rotation in a radial direction of the rotating wheel.

In addition, each of the cutting bites may be provided such that the cutting tip is exposed in the same direction with respect to the rotational direction of the rotating wheel.

As described above, a cutting bite related to the present invention and a cutting apparatus including the same have the following effects.

A cutting bite is provided to sequentially pass through an upper end portion, a central portion, and a lower end portion of stacked films in a thickness direction of the stacked films when a rotating wheel rotates, and is provided such that cutting is performed in a manner in which a cutting direction of a cutting tip is a direction from an outside toward an inside of the stacked films while the cutting bite passes through the upper end portion toward the lower end portion. In addition, the cutting tip is provided such that a cutting line in contact with the stacked films according to a rotational direction of the rotating wheel is formed as a curved line, and is provided in a concave shape in which a central portion of the cutting line is inwardly recessed with respect to both side edges of the cutting line. Accordingly, micro cracks that occur at the film during a chamfering process can be reduced, and a maximum stress applied to the film can be reduced.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 1A and 1B are conceptual views for describing a general chamfering process;

FIGS. 2A and 2B are perspective views illustrating a cutting apparatus related to one embodiment of the present invention;

FIG. 3 is a side view illustrating a cutting bite related to one embodiment of the present invention;

FIG. 4 is a perspective view illustrating the cutting bite illustrated in FIG. 3;

FIG. 5 is a front view illustrating the cutting bite illustrated in FIG. 3;

FIGS. 6 and 7 are conceptual views for describing one operational state of the cutting bite related to one embodiment of the present invention; and FIGS. 8 to 10 are conceptual views for describing one operational state of a cutting bite that has a convex cutting line for a comparison with the cutting bite that has a concave cutting line related to one embodiment of the present invention.

DETAILED DESCRIPTION OF EXEMPLARY EMBODIMENTS

Hereinafter, a cutting bite according to one embodiment of the present invention and a cutting apparatus including the same will be described in detail with reference to the accompanying drawings.

In addition, components that are the same or correspond to each other regardless of reference numerals are referred to by the same or similar reference numerals and redundant descriptions thereof will be omitted, and sizes and shapes of the illustrated components may be exaggerated or reduced for convenience of description.

FIGS. 2A and 2B are perspective view illustrating a cutting apparatus 100 related to one embodiment of the present invention, FIG. 3 is a side view illustrating a cutting bite 200 related to one embodiment of the present invention, FIG. 4 is a perspective view illustrating the cutting bite 200 illustrated in FIG. 3, and FIG. 5 is a front view illustrating the cutting bite 200 illustrated in FIG. 3.

FIGS. 6 and 7 are conceptual views for describing one operational state of the cutting bite 200 related to one embodiment of the present invention.

In addition, FIGS. 8 to 10 are conceptual views for describing one operational state of a cutting bite 300 having a convex cutting line 321 for a comparison with the cutting bite 200 having a concave cutting line 221 related to one embodiment of the present invention.

Referring to FIGS. 2A and 2B, the cutting apparatus 100 related to one embodiment of the present invention is a cutting apparatus (a chamfering machine) used for a chamfering process of stacked films F, and includes rotating wheels 110 each having a center of rotation C, and a plurality of cutting bites 200 are installed at each of the rotating wheels 110 to be spaced a predetermined angle apart from each other in a circumferential direction (a rotational direction) thereof. In addition, the cutting apparatus 100 includes a driving unit configured to rotate the rotating wheels 110 and a transfer unit configured to transfer the stacked films F. In addition, a pair of rotating wheels 110 are provided to face each other at both sides of a supply direction of the stacked films F. In addition, the pair of rotating wheels 110 are disposed to perform a chamfering process on both side surfaces S of the stacked films F.

In addition, at least two cutting bites 200 may be installed in the cutting apparatus 100 at different distances from the center of rotation C in a radial direction of the rotating wheel 110. That is, the cutting bites 200 may have rotational traces with different diameters according to a rotation of the rotating wheel 110. In addition, each of the cutting bites 200 may be provided such that a cutting tip 220 is exposed in the same direction with respect to the rotational direction of the rotating wheel 110.

Referring to FIGS. 3 to 5, the cutting bite 200 relates to a cutting bite used for the chamfering process of the stacked films F. In addition, the cutting bite 200 includes a main body 210 to be fixed to the rotating wheel 110 and the cutting tip 220 provided at a front end portion of the main body 210 and configured to perform the chamfering process while a state of being in contact with the stacked films F is maintained according to the rotation of the rotating wheel 110. The cutting bites 200 are installed at the rotating wheel 110 by fastening units. Particularly, each of the cutting bites 200 is installed such that the fastening unit is inserted in the radial direction of the rotating wheel 110. An installation hole 211 in which the fastening unit is installed is formed in each of the main bodies 210.

In addition, the cutting tip 220 is provided such that the cutting line 221 in contact with the stacked films F in the rotational direction of the rotating wheel 110 is formed as a curved line and has a concave shape in which a central portion of the cutting line 221 is inwardly recessed with respect to both side edges of the cutting line 221. That is, the cutting line 221 has a concave shape in which the central portion of the cutting line 221 is recessed with respect to both of the side edges of the cutting line.

In addition, the cutting tip 220 may be provided such that the cutting line 221 is laterally symmetrical with respect to the central portion of the cutting line 221. In addition, the cutting tip 220 may be provided such that the overall cutting line 221 is positioned at an inside of an imaginary line that connects both of the edges of the cutting line 221.

Meanwhile, among boundary lines of the main body 210 and the cutting tip 220, an installation line 222 facing the cutting line 221 may be provided to have a convexly curved shape.

Referring to FIGS. 6 to 7, the cutting tip 220 is provided such that cutting is performed in a manner in which a cutting direction in which the stacked films F is cut according to the rotation of the rotating wheel 110 is a direction from an outside of the stacked films F (a side portion of the stacked films) toward an inside of the stacked films F (a central portion of the stacked films). That is, the stacked films F is cut from the outside toward the inside during the chamfering process. To this end, the cutting tip 220 is provided such that the cutting line 221 in contact with the stacked films F according to the rotational direction of the rotating wheel 110 is formed as a curved line and has a concave shape in which the central portion of the cutting line 221 is recessed toward the main body 210 with respect to both of the side edges of the cutting line 221. In addition, the cutting line 221 of the cutting tip 220 may be laterally symmetrical with respect to the central portion thereof.

In addition, the cutting tip 220 sequentially passes through an upper end portion, a central portion, and a lower end portion of the stacked films F in a thickness direction of the stacked films F when the rotating wheel 110 rotates. Each of the cutting tips 220 may be provided such that cutting is performed in a manner in which the cutting direction is a direction from the outside toward the inside of the stacked films F while the cutting tip 220 passes through the upper end portion toward the lower end portion. That is, the cutting bite 200 has a structure in which the stacked films F is cut from the outside toward the inside in the thickness direction of the stacked films F regardless of a position of the cutting bite 200 during the chamfering process.

Hereinafter, unlike the cutting line 221 of the cutting bite 200 according to the present invention, the cutting bite 300 provided to have the cutting line 321 in a convexly curved shape will be described with reference to FIGS. 8 to 10.

Referring to FIGS. 8 to 10, cutting is performed in a manner in which a cutting direction of the cutting bite 300 having the cutting line 321 in the convexly curved shape is a direction from an inside toward an outside at an upper end portion and the central portion according to the thickness direction of the stacked films F. In addition, cutting is performed from an outside toward the inside at a lower end portion.

Referring to FIG. 8, when the cutting line 321 cuts the stacked films F along a first trace L1 (the lower end portion of the stacked films) during a chamfering process, cutting is performed in a manner in which a cutting direction of the cutting bite 300 is a direction from the outside toward the inside. However, when the cutting line 321 cuts the stacked films F along a second trace L2 (the upper end portion and the central portion of the stacked films) during the chamfering process, cutting is performed in a manner in which a cutting direction of the cutting bite 300 is a direction from the inside toward the outside. Particularly, when the cutting is performed along the second trace L2, large micro cracks occur due to a shock that is applied to the film being large.

However, in the present invention, the cutting bite 200 having the cutting line 221 in a concavely curved shape has a structure in which the film is cut from the outside toward the inside according to the thickness direction of the stacked films F regardless of a position of the cutting bite 200 during the chamfering process.

The above-described exemplary embodiment of the present invention is disclosed to exemplify the present invention and may be variously changed, modified, and added to by those skilled in the art within the spirit and scope of the present invention, and such changes, modifications, and additions may fall within the scope of the appended claims.

What is claimed is:

1. A cutting apparatus used for a chamfering process of stacked films, the apparatus comprising:
- a rotating wheel having a center of rotation; and
- a plurality of cutting bites installed in a circumferential direction of the rotating wheel to be spaced a predetermined angle apart from each other, wherein:
- each of the cutting bites is provided such that a cutting tip is exposed in the same direction with respect to a rotational direction of the rotating wheel;
- each of the cutting bites includes:
  - a main body to be fixed to the rotating wheel; and
  - the cutting tip provided at a front end portion of the main body and provided to perform the chamfering process while a state of being in contact with the stacked films is maintained according to a rotation of the rotating wheel;
- the cutting tip is provided such that cutting line of the cutting tip in contact with the stacked films according to a rotational direction of the rotating wheel is formed as a curved line; and
- the cutting line is provided in a concave shape in which a central portion of the cutting line is inwardly recessed with respect to both side edges of the cutting line.

2. The cutting apparatus of claim 1, wherein the cutting tip is laterally symmetrical with respect to the central portion of the cutting line.

3. The cutting apparatus of claim 2, wherein the cutting tip is provided such that an overall cutting line is positioned at an inside of an imaginary line that connects both of the edges of the cutting line.

4. The cutting apparatus of claim 1, wherein at least two cutting bites are installed at different distances from the center of rotation in a radial direction of the rotating wheel.

5. The cutting apparatus of claim 1, wherein each of the cutting tips is provided such that cutting is performed in a manner in which a cutting direction of the stacked films is a direction from an outside toward an inside of the stacked films according to the rotation of the rotating wheel.

6. A cutting apparatus used for a chamfering process of stacked films, the apparatus comprising:

a rotating wheel having a center of rotation; and a plurality of cutting bites installed in a circumferential direction of the rotating wheel to be spaced a predetermined angle apart from each other, wherein:

each of the cutting bites includes:

a main body to be fixed to the rotating wheel; and a cutting tip provided at a front end portion of the main body and provided to perform the chamfering process while a state of being in contact with the stacked films is maintained according to a rotation of the rotating wheel;

the cutting tip is provided such that cutting is performed in a manner in which a cutting direction of the stacked films according to the rotation of the rotating wheel is a direction from an outside toward an inside of the stacked films, the cutting tip is provided such that a cutting line of the cutting tip in contact with the stacked films according to a rotational direction of the rotating wheel is formed as a curved line; and the cutting line is provided in a concave shape in which a central portion of the cutting line is recessed toward the main body with respect to both side edges of the cutting line.

7. The cutting apparatus of claim 6, wherein the cutting tip is laterally symmetrical with respect to the central portion of the cutting line.

8. The cutting apparatus of claim 6, wherein the cutting tip sequentially passes through an upper end portion, a central portion, and a lower portion of the stacked films in a thickness direction of the stacked films when the rotating wheel rotates, and is provided such that the cutting is performed in a manner in which the cutting direction is the direction from the outside toward the inside of the stacked films while the cutting tip passes through the upper end portion toward the lower end portion.

9. The cutting apparatus of claim 6, wherein at least two cutting bites are installed at different distances from the center of rotation in a radial direction of the rotating wheel.

10. The cutting apparatus of claim 6, wherein each of the cutting bites is provided such that the cutting tip is exposed in the same direction with respect to a rotational direction of the rotating wheel.

* * * * *